United States Patent [19]

Carey et al.

[11] Patent Number: 5,043,969

[45] Date of Patent: Aug. 27, 1991

[54] TWO-STAGE LINEAR DRIVE APPARATUS FOR AN INFORMATION STORAGE DISK DRIVE SYSTEM

[75] Inventors: James R. Carey, Rochester, N.Y.; Patrick J. Champagne, Cupertino, Calif.

[73] Assignee: Literal Corporation, Colorado Springs, Colo.

[21] Appl. No.: 287,803

[22] Filed: Dec. 20, 1988

[51] Int. Cl.⁵ ............ G11B 33/02; G11B 5/016; G11B 17/04
[52] U.S. Cl. .................... 369/77.2; 369/75.1; 369/75.2; 369/77.1; 360/99.02; 360/99.06
[58] Field of Search ............ 369/77.2, 77.1, 75.1, 369/75.2, 191; 360/99.02, 99.06, 97

[56] References Cited

U.S. PATENT DOCUMENTS

| 4,504,879 | 3/1985 | Toldi et al. .................. 360/105 |
| 4,507,769 | 3/1985 | Fukumitsu et al. ............ 369/77.2 |
| 4,546,396 | 10/1985 | Schatteman ............ 360/99.06 X |
| 4,607,361 | 8/1986 | Schuitmaker et al. .......... 369/75.2 |
| 4,680,748 | 7/1987 | Kobayashi .................. 369/77.1 |
| 4,701,901 | 10/1987 | Imai ...................... 369/75.2 |
| 4,709,282 | 11/1987 | Tamada .................... 360/97 |
| 4,710,831 | 12/1987 | Nishimura .............. 360/99.02 X |
| 4,731,775 | 3/1988 | Katsuyama et al. ............ 369/77.2 |
| 4,802,041 | 1/1989 | Uehara .................. 360/99.06 |
| 4,866,551 | 9/1989 | Kishimoto et al. ........ 360/99.06 X |

FOREIGN PATENT DOCUMENTS

8702502  4/1987  European Pat. Off. ........ 369/75.1

*Primary Examiner*—Stuart S. Levy
*Assistant Examiner*—Tien Ba Pham
*Attorney, Agent, or Firm*—Kinney & Lange

[57] ABSTRACT

A linear drive apparatus for the load mechanism of an information storage disk drive system utilizes over-center pivotable link pin connections between a linear drive lever and counter-rotating drive cranks used for raising and lowering a disk spindle drive into and out of engagement with the storage disk. The over-center pivoting link pins provide an idle period for the spindle lift mechanism while the same linear drive lever powers the cartridge positioning apparatus utilized for loading and unloading the disk cartridge under power from the disk drive system.

4 Claims, 5 Drawing Sheets

TWO-STAGE LINEAR DRIVE APPARATUS FOR AN INFORMATION STORAGE DISK DRIVE SYSTEM

CROSS-REFERENCE TO RELATED APPLICATION

Reference is made to the following U.S. patent applications, all filed concurrently herewith: Ser. No. 07/287,805, entitled LOAD MECHANISM FOR A BEAM ADDRESSABLE INFORMATION STORAGE DISK DRIVE SYSTEM by James R. Carey, David L. Rowden and Patrick Champagne;

Ser. No. 07/287,806, entitled DISK CARTRIDGE POSITIONING MECHANISM FOR AN INFORMATION STORAGE DISK DRIVE SYSTEM by James R. Carey, James D. Harney and Ronald A. Crain;

Ser. No. 07/287,802, entitled INFORMATION STORAGE DISK LOADING APPARATUS WITH DRIVE GEAR OVERLOAD PROTECTION by James R. Carey.

FIELD OF THE INVENTION

This invention relates to optical beam addressable disk drive systems and more particularly to motor actuated drive apparatus useful in such systems.

BACKGROUND OF THE INVENTION

There is a need for a compactly structured beam addressable information disk drive system capable of fitting within the half height format of a personal computer drive bay. Provision must be made in such a system for mechanisms to provide the functions of properly positioning a relatively bulky storage disk cartridge in the drive system and of bringing the storage disk and a disk spindle drive mechanism into engagement for rotation of the disk during read/write operation. It is desirable that these functions be provided by motor actuated apparatus for smoothness and reliability of operation. It is also desirable that a single motor actuated drive be employed to conserve space utilization and minimize the number of components involved. However, the operations of loading and unloading the cartridge must be performed at points in time separate from the operations of engaging and disengaging the spindle drive and disk. It is therefore an object of the invention to provide a single motor actuated drive for the load mechanism of a beam addressable information storage disk drive system that is simple and low cost and that will provide different drive functions in a timed sequence to separate functional mechanisms in the drive system.

SUMMARY OF THE INVENTION

Thus, in accordance with the invention, two-stage linear drive apparatus for an information storage disk drive system is provided which comprises drive means including a motor actuator and a linear drive lever responsive thereto for providing a bi-directional linear driving force through a predetermined length of travel comprised of first and second drive segments. The apparatus also comprises first drive utilization means responsive to the drive means during the first drive segment to perform a loading operation on the disk cartridge during forward travel of the drive lever and an unloading operation on the disk cartridge during reverse travel of the drive lever, and second drive utilization means responsive to the drive means during the second drive segment to cause the spindle drive and the disk to engage during forward travel of the drive lever and to disengage during reverse travel of the drive lever. In accordance with a particular feature of the invention, pivotable over-center link means connects the second drive utilization means to the linear drive lever and is adapted to pivot during the first drive segment without applying significant driving force from the drive lever to the second drive utilization means until the drive lever begins the second segment of travel.

DETAILED DESCRIPTION OF THE DRAWINGS

Figure 1:
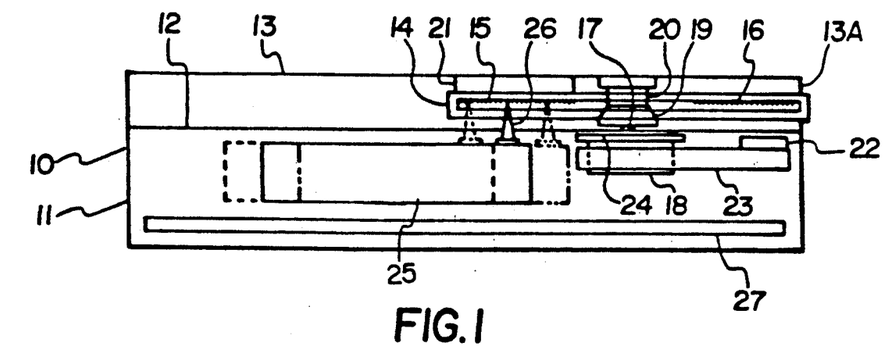
FIG. 1 is a schematic side elevation view of a magneto-optical disk drive system suitable for embodiment therein of two-stage drive apparatus of the present invention.

Referring to FIG. 1, a schematic side view of an information storage disk drive system 10 adapted for embodiment of the two-stage linear drive of the invention includes a base enclosure 11 having a central mount plate 12 which forms a primary mounting base for the components of the system 10. An upper enclosure 13 includes provision for receiving through front slot 13a and holding in its own plane a disk cartridge 14 having nested therein a magneto-optical information storage disk 15. Closely spaced data tracks 16 are formed in concentric grooves on the upper planar surface of disk 15 by deposition of a recording medium comprising a thin layer of suitable thermo-magneto-optical material utilizing processes well known for this purpose. As an alternative to concentric grooves, data tracks 16 may be "pseudo grooves" comprised of a single elongated track formed in a spiral with its center coincident with the center of disk 15. A drive spindle 17 is drivingly connected, at its lower end, to spindle drive motor 18 and, at its upper end, to a disk engaging chuck and centering cone assembly 19 which cooperates with a disk clamp 20 positioned above disk 15 to engage and rotationally drive the disk during read/write operation of the system 10. An electromagnetic bias coil 21 is held in place on upper housing 12 above disk 15 and is supplied with current from a source, not shown, to generate a concentrated magnetic field which is applied to the recording medium of the data tracks 16 as part of the magneto-optical read/write process. Spindle motor 18 is mounted on a vertically movable platform 24 which is supported on a load drive mechanism mount plate 23 by means of a lift apparatus described in more detail subsequently. Load drive apparatus 22, including the two-stage drive of the invention, is also housed on mount plate 23 and operates to provide driving force to actuate the lift apparatus and also cartridge positioning apparatus in upper housing 13 and also described in more detail hereinafter.

A read/write head 25 is translatably suspended from central mount plate 12 by means of tracking actuator apparatus which moves the head laterally (right and left as viewed in phantom in the drawing) along a drive path which is parallel to the planar surface of disk 15 and generally radial to the disk center to position and hold a focussed laser optical beam 26 generated within head 25 on a selected one of data tracks 16. Suitable tracking actuator apparatus for this purpose is disclosed in copending application Ser. No. 07/287,801, filed Dec. 20, 1988, entitled "SINGLE STAGE TRACKING ACTUATOR APPARATUS FOR OPTICAL BEAM INFORMATION STORAGE DRIVE SYSTEM" and the details are not repeated here as they are not required for an understanding of the present invention. A printed circuit board 27 may be positioned along the bottom of base enclosure 11 to provide necessary control functions for operation of the disk drive system.

Figure 2:
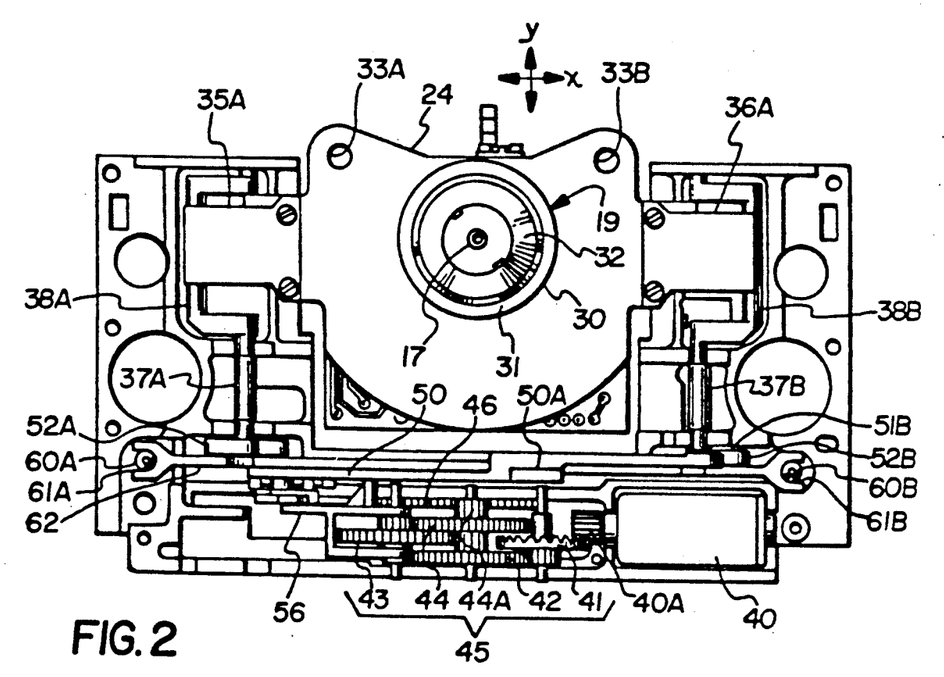
FIG. 2 is a top plan view of a load drive mechanism illustrating a motor-actuated linear drive lever serving as the motive force for the two-stage linear drive apparatus of the present invention.
Figure 3:
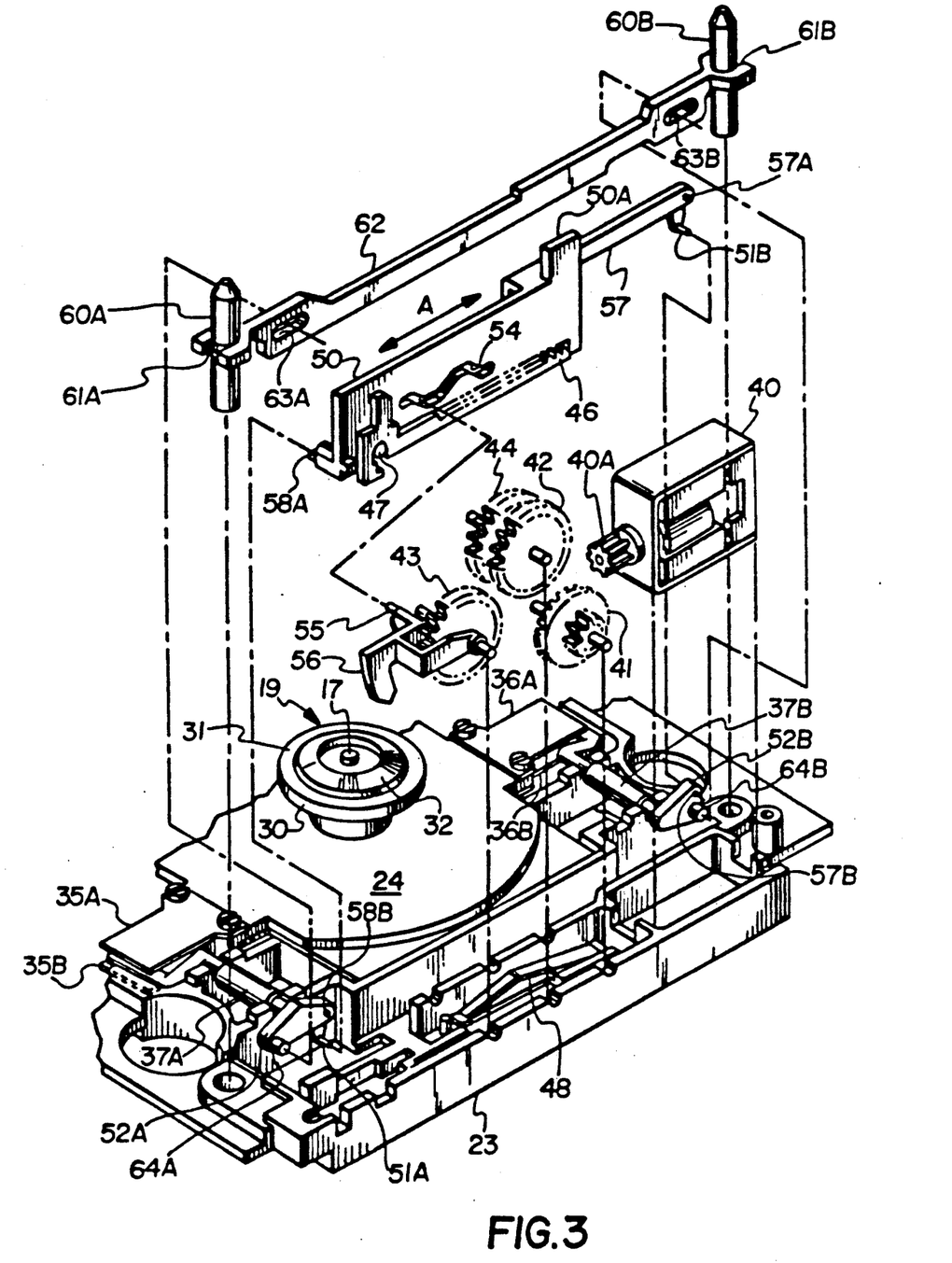
FIG. 3 is a front partially exploded perspective view of the load drive mechanism of FIG. 2.
Figure 4:
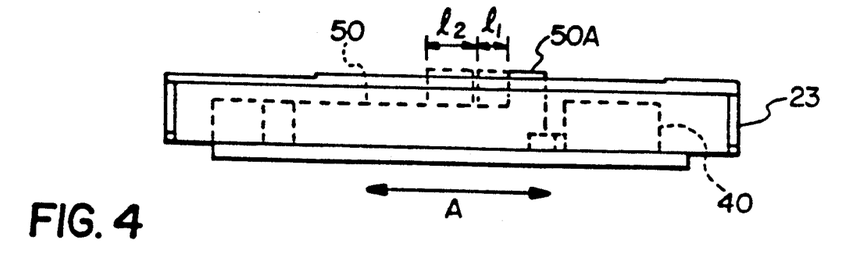
FIG. 4 is a front schematic view of the linear drive of FIG. 2 useful in explaining the operation of the present invention.

Referring jointly to FIGS. 2 and 3, two-stage linear drive apparatus of the invention comprises drive means including reversible load drive motor 40 and gear train 45 for providing a bi-directional linear driving force through a predetermined length of travel having first and second drive segments shown as lengths $l_1$ and $l_2$ in FIG. 4. Gear train 45 includes face gear 41, meshed with motor drive pinion gear 40a, driving a series of spur/pinion gears 42–44 the final pinion gear of which is meshed with rack gear 46. Face gear 41 and spur pinion gears 42–44 serve as speed-reducing, torque-increasing means while the final rack gear 46 serves to convert the rotational motion of motor 40 to the two stage linear lateral motion used, in accordance with the invention, in cartridge loading/unloading and spindle/disk engaging/disengaging operations.

The drive means also includes linear load drive lever 50 which is provided with an integrally formed pin 47 journalled in a notch at one end of rack gear 46 so as to be driven laterally by gear 46 in a continuous sequence through the two drive segments $l_1$ and $l_2$ shown in FIG. 4. An upstanding tab 50a is formed on the upper edge of drive lever 50 and extends through central mount plate 12 to drivingly engage cartridge positioning apparatus in upper enclosure 13, described below. In accordance with a particular feature of the invention, a pair of link pins 51a and 51b are pivotably attached, respectively, at each end of drive lever 50 to engage with drive arms 52a and 52b of cranks 37a and 37b which are operative to raise and lower platform 24 as drive lever 50 moves laterally left and right respectively. An elongated leaf spring 48 is located beneath rack 46 and serves, in part, to urge the rack teeth into firm engagement with pinion gear 44a. A serpentine cam slot 54 in drive lever 50 engages with a follower pin 55 on a flag 56 and operates, as load lever 50 moves back and forth, to lower and raise the flag into and out of the path of an optical switch (not shown) mounted on circuit board 27 which is employed for the purpose of turning the drive motor 40 off at each end of the lateral travel of load lever 50.

As will be explained in more detail subsequently, when a disk cartridge is loaded into disk drive system 10, drive lever 50 is driven continuously leftward through an initial drive segment $l_1$, during which the cartridge is positioned, under power, in place in upper enclosure 13 after being manually inserted part way by the operator; followed by a second drive segment $l_2$, during which platform 24 is raised to bring spindle assembly 19 into engagement with disk 15 in the cartridge. When cartridge 14 is to be unloaded from the drive system, drive lever 50 is driven continuously rightward through drive segment $l_2$, during which platform 24 is lowered to disengage spindle assembly 19 from the disk, followed by drive segment $l_1$, during which the cartridge is moved under power out from the disk drive system to a point at which it can be grasped by the operator for manual removal from the drive.

Figure 5:
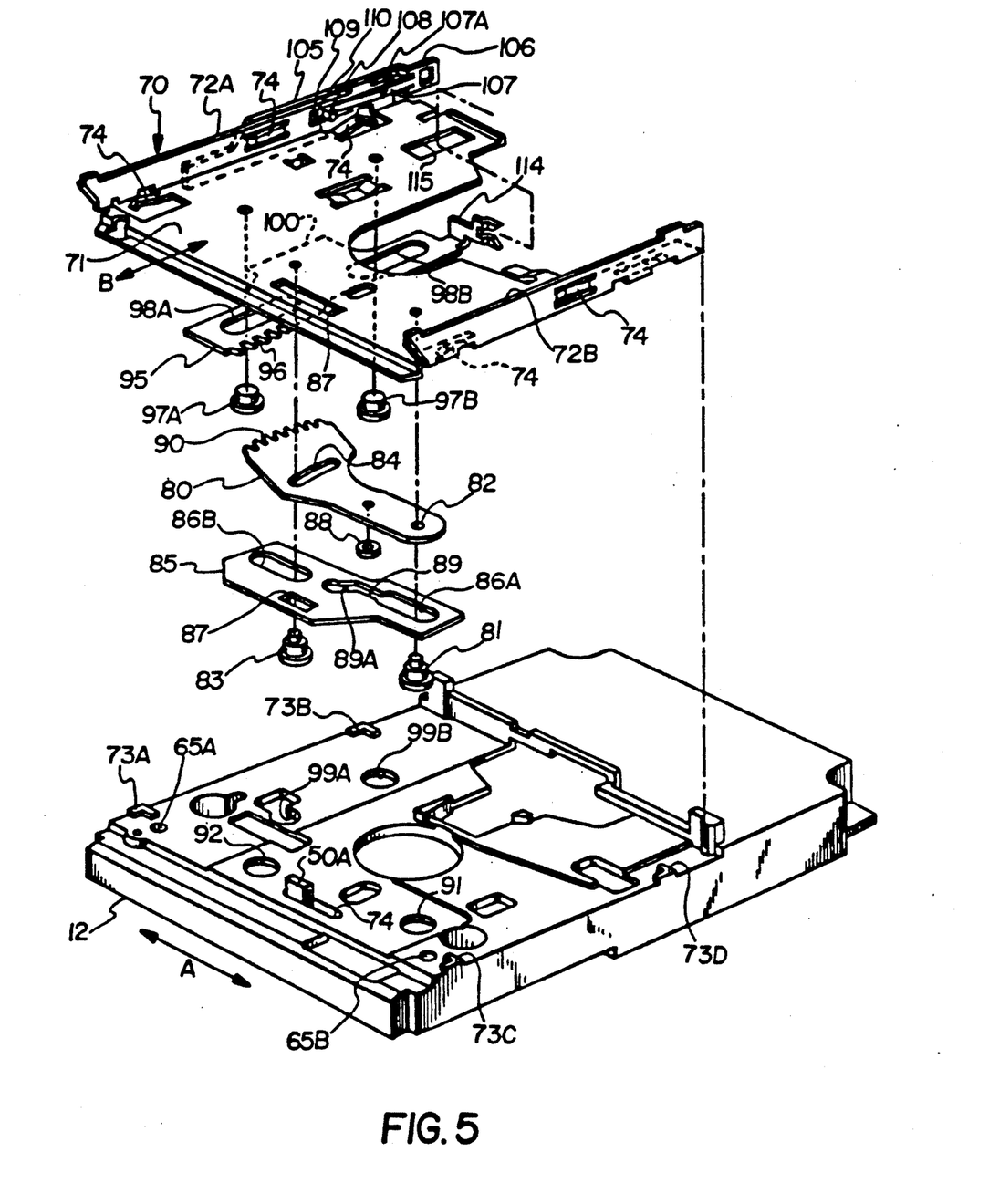
FIG. 5 is an exploded perspective view of cartridge positioning apparatus useful in conjunction with the two-stage linear drive of the present invention.

Referring to FIG. 5, there is shown drive utilization means responsive to the linear drive means during the drive segment $l_1$ to perform a loading operation on the disk cartridge during forward travel of drive lever 50 (leftward as as represented by arrow A in FIG. 4) and an unloading operation on the cartridge during reverse travel of the lever. The utilization means includes guide plate 70 having a bottom plate 71 and upstanding sides 72a, 72b mounted above mount plate 12 on raised lands 73a–73d so as to form a planar interstitial space between the upper surface of mount plate 12 and the undersurface of guide bottom plate 71. Various bent tab fingers 74 are optionally formed in bottom plate 71 and sides 72a, 72b to assist in positioning and holding cartridge 14 firmly in the guide 70. Drive tab 50a extends up through an elongated slot 74 in mount plate 12 into the interstitial space between mount plate 12 and bottom plate 71 to provide reciprocal, lateral driving motion in the direction of arrow A normal to the longitudinal cartridge movement direction of arrow B. Pivoted sector gear 80 is provided for converting the lateral motion of tab 50a to the longitudinal motion of arrow B and is pivotally secured to the underside of bottom plate 71 by two-tiered pivot post 81 extending through pivot hole 82 and by a similar two-tiered follower post 83 extending through curved slot 84. A lateral linear drive plate 85 is also mounted on posts 81 and 83 extending through elongated linear slots 86a and 86b. A rectangular aperture 87 is provided at one side of drive plate 85 to receive drive tab 50a. A follower roller 88 is secured to sector gear 80 at a point intermediate pivot hole 82 and sector gear teeth 90 and is adapted to ride in cam slot 89 which is provided with a ramped cam segment 89a. The angle of ramped cam slot 89a may be selected in relation to the positioning of roller 88 relative to pivot point 82 to provide suitable amplification of the lateral motion of tab 50a into the longitudinal motion desired for cartridge loading and unloading purposes. Linear drive lever 85 is suspended under bottom plate 12 by the lower shoulders of posts 81, 83 which, in order to keep the interstitial space at a minimum, may be positioned in recesses 91 and 92.

Longitudinal linear drive plate 95, having rack gear teeth 96 adapted to engage with and be driven by sector gear teeth 90, is mounted in the interstitial space and is suspended from bottom plate 71 on the shoulders of a pair of posts 97a, 97b extending through linear slots 98a, 98b. The shoulders of posts 97a, 97b may also be positioned in recesses 99a, 99b to maintain minimum interstitial space. A lateral extension 100 of drive plate 95 projects out the side of the interstitial space and engages a load drive plate 105 mounted outside the interstitial space on the upstanding side 72a of guide 70.

The rear portion 106 of load plate 105 is bent to provide an offset from which a resilient finger 107 extends forwardly along the inner surface of side 72a. Finger 107 is bent outward slightly at an intermediate point 107a and has a lug 108 mounted on its forward end, the finger and lug fitting within a slot 109 formed in side 72a. A small outwardly bent stationary tab 110 is provided on the end of a finger formed from side 72a in slot 109 to provide a ramp surface which engages a mating back surface of lug 108. Lug 108 is operative when load drive plate 105 moves rearwardly during a loading operation to come into engagement with a mating notch formed in the side of disk cartridge 14.

A tab 114 formed at the rear of longitudinal linear drive plate 95 projects up through a rectangular aperture 115 in bottom plate 71 and is operative as drive plate 95 is moved forward during a cartridge unloading operation to contact the leading edge of the cartridge so as to pull the cartridge forward, under power, as part of the unloading operation.

Referring again jointly to FIGS. 2 and 3, there is shown second drive utilization means for causing spindle assembly and disk 15 to be engaged and disengaged after loading and before unloading of cartridge 14 by the first drive utilization means of FIG. 5. Thus second drive utilization means includes spindle 17, disk drive spindle assembly 19 and spindle motor 18 (FIG. 1) precision mounted on a vertically translatable platform 24. Spindle assembly 19 includes a spindle chuck 30, having a disk engaging surface 31, and a disk centering cone 32 mounted centrally of the disk engaging surface 31. Horizontally disposed platform 24 is held firmly but loosely in place by side mounted parallel leaf springs 35a, 35b and 36a, 38b coupled to eccentrically mounted support arms 38a, 38b on rotational cranks 37a and 37b. Because of the relatively loose compliant mounting of platform 24 on the support arms 38a, 38b, a pair of positioning holes 33a, 33b are formed in platform 24 to slidably engage with a mating pair of positioning pins (not shown) depending from the bottom surface of mount plate 12 thereby providing proper "x-y" axis positioning of the platform and the chuck assembly 19. Cranks 37a, 37b, when rotated by the two-stage linear drive apparatus of the invention, serve to lift platform 24 in the final phase of a cartridge loading operation (drive segment $l_2$) to bring spindle assembly 19 into engagement with disk 15 after the cartridge 14 is properly positioned in upper enclosure 13 and to lower platform 24 at the start of a cartridge unloading operation (also drive segment $l_2$) to clear spindle assembly from upper enclosure 13 thereby allow the cartridge 14 to be removed from the disk drive system 10.

In addition to the lift mechanism just described for raising and lowering platform 24, the second drive utilization means may also include means for laterally positioning disk cartridge 14 in upper enclosure 13 after the cartridge has been inserted and positioned longitudinally by the mechanism of FIG. 5. This additional means includes a pair of cartridge positioning pins 60a and 60b having chamfered upper ends adapted to engage corresponding positioning notches 14a, 14b (not shown) formed in the undersurface of the cartridge 14 located at the outer rear corners of the cartridge. Pins 60a, 60b are journalled in slots 61a, and 61b at opposite ends of lift lever 62. Cam slots 63a and 63b are formed in lever 62 near the outer ends thereof to engage drive pins 64a and 64b mounted eccentrically on arms 52a and 52b of the rotational drive cranks 37a, 37b. A pair of precision holes 65a, 65b (FIG. 5) are formed in central mount plate 12 to receive and align positioning pins 60a, 60b for properly positioned vertical translation into engagement with the notches on the cartridge.

Means for coupling drive lever 50 to the first and second drive utilization means includes the aforementioned vertical drive tab 50a which engages linear drive plate 85 of FIG. 5 and includes over-center pivotable link pin means 51a and 51b connected from the ends of drive lever 50 to eccentric drive arms 52a, 52b of cranks 37a, 37b. As can best be seen in FIG. 3, load drive lever 50 has one link connecting point 57a at the end of arm 57 to an eccentrically positioned point 57b on drive arm 52b. Point 57a is located above drive arm 52b and travels over arm 52b as drive lever 50 moves left and right. Additionally, drive lever 50 has another link connecting point 58a at the lower left corner of lever 50 to an eccentrically positioned point 58b on drive arm 52a. Point 58a is located below drive arm 52a and travels below arm 52a as lever 50 travels left and right. In accordance with a feature of the invention, the positioning of points 58b and 57b on crank drive arms 52a, 52b with respect to points 58a and 57a, respectively, on drive lever 50 is such that the link pins 51b and 51a are adapted to pivot above and below crank arms 52b and 52a, respectively, without significantly driving the cranks during the first drive segment $l_1$ and to cause driving of the cranks during the second drive segment $l_2$, as will be described in greater detail below.

Figure 6A:
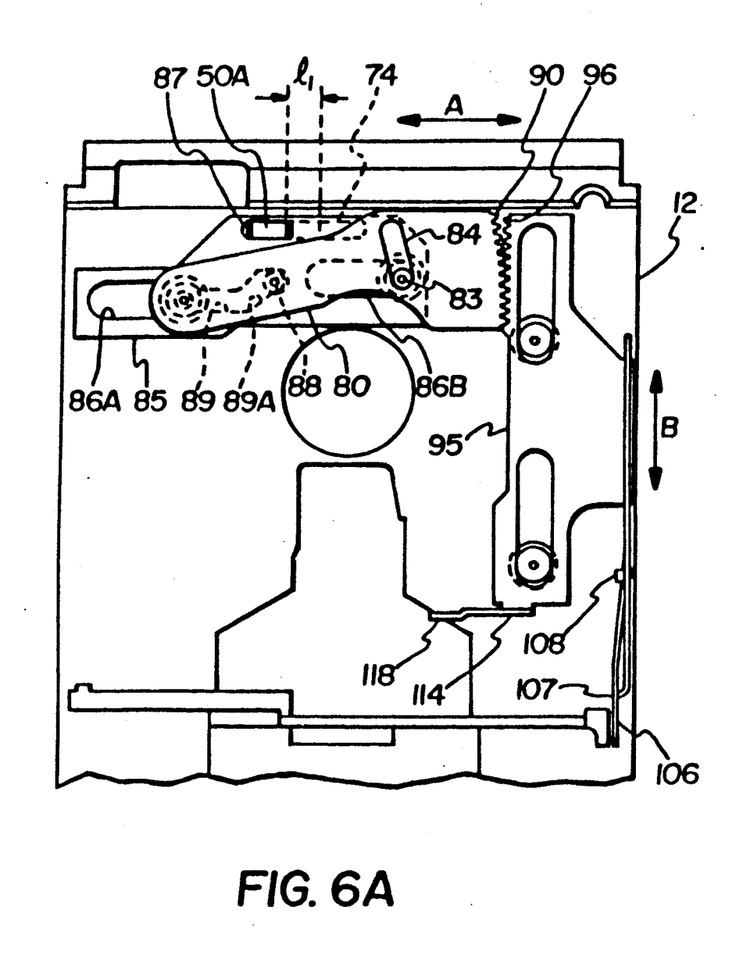
FIGS. 6(a) and 6(b) are simplified top plan views of the apparatus of FIG. 5 useful in describing the operation thereof.
Figure 6B:
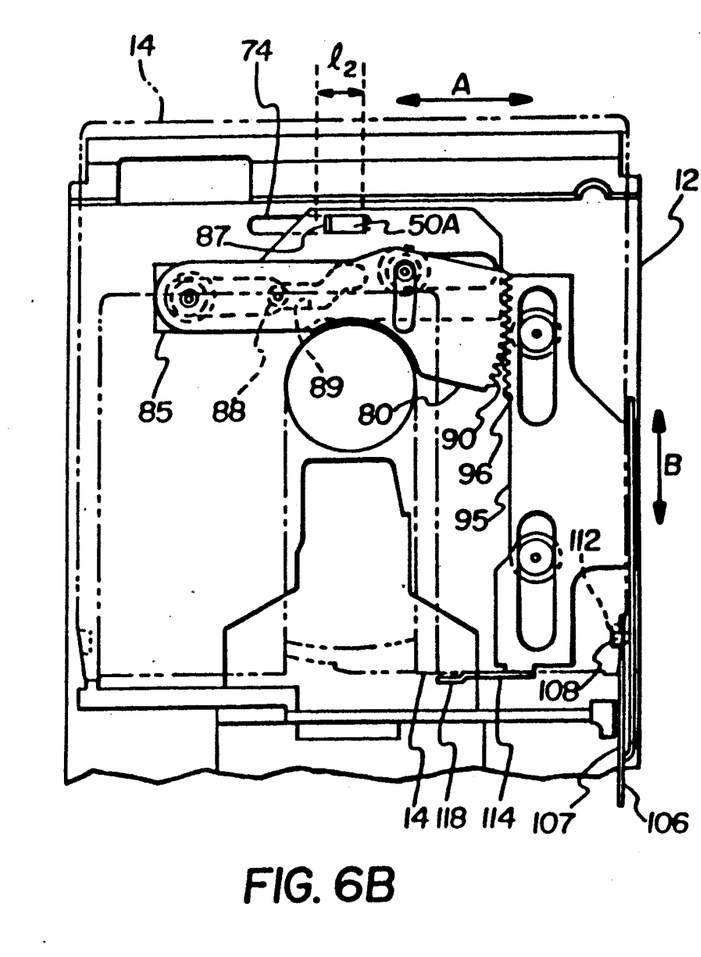

Referring now to FIGS. 6a and 6b, the operation of the cartridge positioning apparatus in loading and unloading the cartridge 14 under power can be readily seen with some of the components, such as cartridge guide 70, removed to aid in the explanation. Thus FIG. 6a illustrates the position of lateral drive tab 50a, lateral drive plate 85, sector gear 80, and longitudinal drive plate 95 prior to insertion of a disk cartridge. Drive tab 50a and drive plate 85 are at their leftmost position in the lateral direction illustrated by arrow A. Follower roller 88 of sector gear 80 is at the leftmost end of cam slot 89 which positions sector gear 80, in the longitudinal direction of arrow B, toward the front of the disk drive system. As a consequence of the engagement of sector gear teeth 90 and rack gear teeth 96, longitudinal drive plate 95 and load drive plate 105 are in the forwardmost position and grab lug 108 is biased outwardly on cam tab 110 (FIG. 5). When a disk cartridge is manually inserted into guide 70 and reaches the point at which the leading edge of the cartridge is near tab 114, a switch (not shown) is engaged to activate reversible load drive motor 40 which in turns causes drive tab 50a to translate laterally to the right.

During the initial travel of the drive tab 50a through drive segment $l_1$, drive plate 85 is driven laterally to the right forcing follower roller 88 and the attached sector gear 80 to move longitudinally rearward as as follower 88 traverses the ramp cam surface 89a. This action forces drive plate 95 rearward and continues until follower 88 reaches the end of ramp 89a at the end of initial drive segment $l_1$ of tab 50a. As longitudinal drive plate 95 is driven rearward, it carries with it load drive plate 105. When load drive plate 105 begins its rearward movement, lug 108 is cammed inward on cam tab 110 bringing lug 108 into engagement with notch 112 formed in the side of cartridge 14. Cartridge 14 is then pulled by the mechanism just described, under power, into its final position as shown in FIG. 6b. In the meantime, load lever 50 continues its lateral travel and, as drive tab 50a moves drive plate 85 through second drive segment l₂, follower roller 88 remains stationary as it "idles" through the remainder of slot 89. During this latter period, load lever 50 is operative to cause drive cranks 37a, 37b to counter-rotate in the direction needed to raise platform 24 to bring centering cone 32 and spindle chuck 30 into engagement with disk 15 in the now properly positioned cartridge 14. When load lever 50 reaches the end of drive segment l₂, flag 56 (FIG. 3) operates in conjunction with the optical off switch on printed circuit board 27 to remove power from load motor 40.

When it is desired to remove cartridge 14 from the disk drive system, the operator engages a switch (not shown) to apply power to motor 40 in the reverse direction causing load lever 50 to be driven in the rightward lateral direction as viewed in FIG. 4. During the initial rightward movement of load lever 50, cranks 37a, 37b are counter-rotated in the reverse direction to lower platform 24 removing centering cone 32 and chuck spindle 30 from disk 15. During this time, drive tab 50a moves lateral drive plate 85 to the left, as viewed in FIG. 6B, with sector gear follower roller 88 idling in the straight segment of slot 89 for the duration of drive segment l₂. When platform 24 has been fully lowered at the completion of drive segment l₂ and the beginning of segment l₁, follower roller engages ramp 89a and is forced longitudinally forward thus pivoting sector gear 80 forward. This action drives longitudinal drive plate 95 forward which brings unloading tab 114 into contact with the leading edge of cartridge 14 thereby forcing cartridge 14 outward of the disk drive system by a distance sufficient to allow the user to grasp the cartridge and manually remove it from the drive system. As drive plate 95 moves forward, it carries load drive plate 105 forward thus allowing lug 108 to cam outward on cam tab 110 to free itself from engagement with slot 112 in cartridge 14. When load drive lever 50 reaches its leftmost position, the operation of flag 56 on the optical switch on circuit board 27 results in the turning off of motor 40 thus terminating the power unloading process.

Figure 7A:
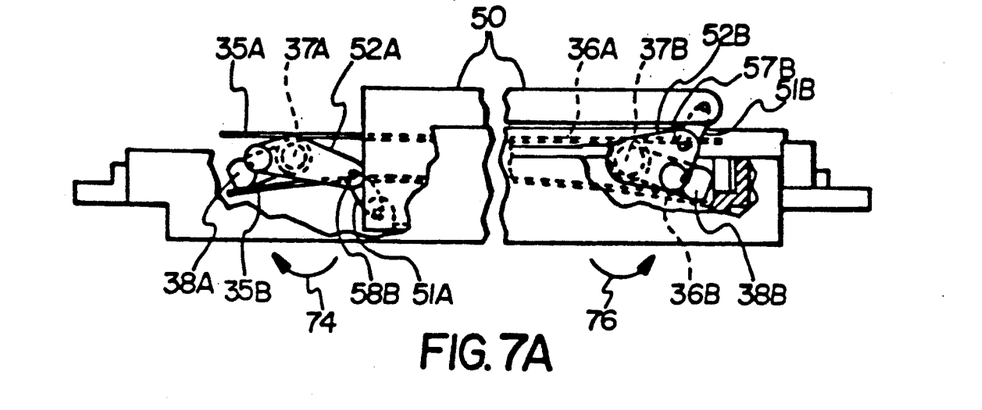
FIGS. 7(a)–7(c) are simplified cutaway views of the linear drive mechanism illustrated in FIGS. 2 and 3 that are useful in describing the operation thereof.
Figure 7B:
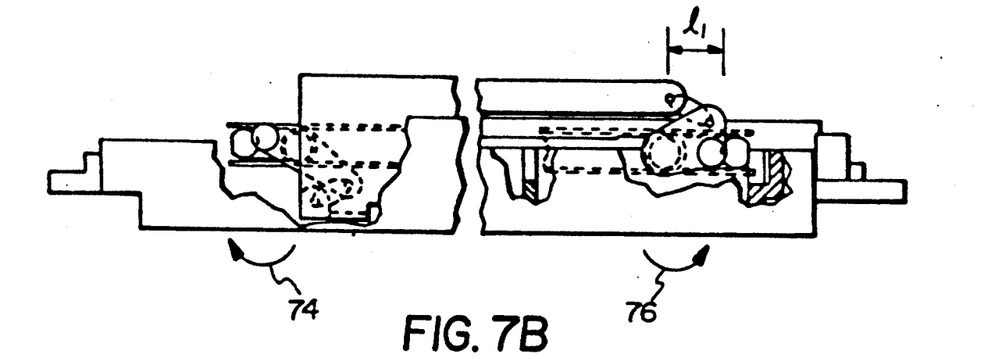
Figure 7C:
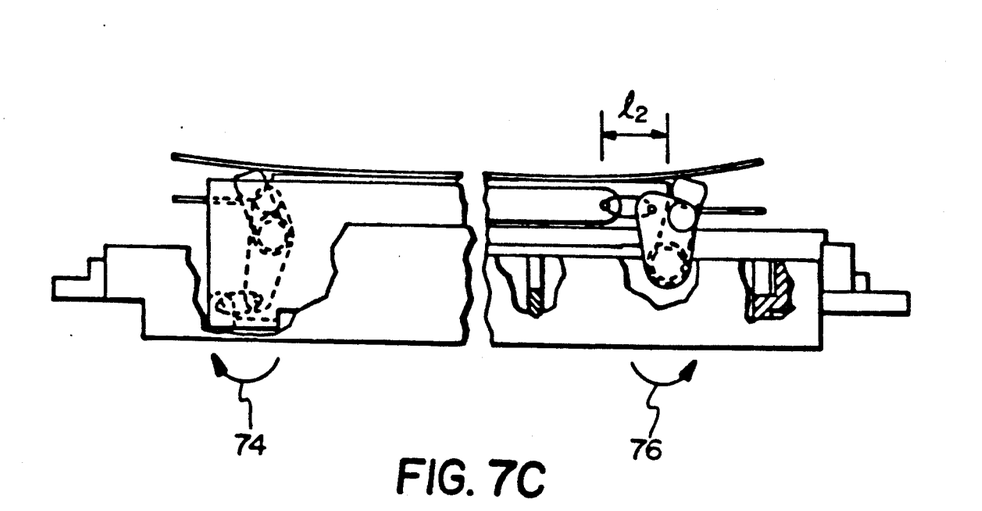

Turning now to FIGS. 7(a)–7(c), the manner in which load drive lever 50 operates to rotate cranks 37a, 37b will now be explained in greater detail. As shown in these figures, load drive lever 50 is connected to drive crank arms 52a, 52b by means of pivotable links 51a and 51b, respectively. When load lever 50 is in the full right position (FIG. 7(a)), which is the case when there is no disk cartridge loaded in the drive, pins 51a and 51b are positioned overcenter to the right of their respective drive crank arms 52a and 52b. This corresponds to the downmost position of spindle drive platform 24. As explained in connection with FIGS. 6(a) and 6(b), when a disk cartridge is manually inserted into upper housing 13 drive motor 40 is activated and drives load drive lever leftward to complete the final loading of the cartridge under power. During this initial drive segment l₁, links 51a and 51b pivot over-center of crank arm drive holes 58b and 57b, respectively, with link 51a pivoting under arm 52a and link 51b pivoting over arm 52b, thus providing an idle period during which platform 24 remains stationary while cartridge 14 is being powered into its final position.

Once cartridge 14 is fully seated, the continued leftward motion of load drive lever 50 puts links 51a, 51b in tension with their respective crank drive arms 52a and 52b and results in counter-rotation of cranks 37a and 37b, as indicated by arrows 74 and 76, thus raising platform support arms 51a, 51b. As the support arms are rotated upwards, they also slide inward in the spans between the pairs of parallel leaf springs 35a, 35b and 36a, 36b. This action continues through drive segment l₂ until load drive lever 50 reaches its leftmost position as shown in FIG. 7(c) at which time motor 40 is inactivated by the action of flag 56, as previously described.

The process just described is reversed when a cartridge is unloaded from the drive system. More specifically, when motor 40 is activated to begin the unloading process, load drive lever begins its movement rightward thus putting link pins 51a, 51b in compression between their respective connecting point. This forces counter-rotation of cranks 37a, 37b in a direction opposite to arrows 74 and 76 thus lowering platform 24 and disengaging spindle assembly 19 from the disk in cartridge 14. When platform support arms 38a and 38b reach their positions shown in FIG. 7(b), link pins 51a, 51b begin their over-center pivoting through drive segment l₁ from the position shown in FIG. 7(b) to their final position shown in FIG. 7(a).

The invention has been described in detail with particular reference to a presently preferred embodiment, but it will be understood that variations and modifications can be effected within the spirit and scope of the invention.

What is claimed is:

1. Two-stage linear drive apparatus for an information storage disk drive system comprising:
    drive means including a motor actuator and a linear drive lever responsive thereto for providing a bi-directional linear driving force through a predetermined length of travel comprised of first and second drive segments;
    first drive utilization means responsive to said drive means during said first drive segment to perform a loading operation on said disk cartridge during forward travel of said drive lever and an unloading operation on said disk cartridge during reverse travel of said drive lever;
    second drive utilization means responsive to said drive means during said second drive segment to cause said spindle drive and said disk to engage during forward travel of said drive lever and to disengage during reverse travel of said drive lever; and
    pivotable over-center link means connecting said second drive utilization means to said linear drive lever for pivoting during said first drive segment without applying significant driving force from said driving lever to said second drive utilization means until said drive lever begins said second segment of travel.

2. Drive apparatus of claim 1 in which said second drive utilization means having an eccentric drive arm and in which said link connects said linear drive lever to said eccentric drive arm.

3. Drive apparatus of claim 1 in which said second drive utilization means includes a pair of spaced apart rotational drive cranks each having an eccentric drive arm and in which a pair of over-center links are individually connected from said eccentric drive arm to opposite ends of said drive lever.

4. Two-stage linear drive apparatus for an information storage disk drive system comprising:
    drive means including a motor actuator and a linear drive lever responsive thereto for providing a bi-directional linear driving force through a predetermined length of travel comprised of first and second drive segments;

first drive utilization means responsive to said drive means during said first drive segment to perform a loading operation on said disk cartridge during forward travel of said drive lever and an unloading operation on said disk cartridge during reverse travel of said drive lever;

second drive utilization means responsive to said drive means during said second drive segment to cause said spindle drive and said disk to engage during forward travel of said drive lever and to disengage during reverse travel of said drive lever, wherein said second drive utilization means includes a pair of spaced apart rotational drive cranks each having an eccentric drive arm and in which a pair of over-center links are individually connected from said eccentric drive arm to opposite ends of said drive lever, said drive cranks are adapted to counter-rotate with respect to each other, in which said linear drive lever has a link connecting point at one end that travels over the rotating axis of one crank and a link connecting point at the opposite end of the drive lever that travels below the rotating axis of the other crank, and in which said links individually connect one of said link connecting points and are adapted to pivot respectively above and below said cranks during said first drive segment thereby to cause said counter-rotation of said cranks during said second drive segment; and pivotable over-center link means connecting said second drive utilization means to said linear drive lever for pivoting during said first drive segment without applying significant driving force from said driving lever to said second drive utilization means until said drive lever begins said second segment of travel.

* * * * *